United States Patent
Liu et al.

(10) Patent No.: US 9,661,723 B2
(45) Date of Patent: May 23, 2017

(54) METHOD FOR CONTROLLING LIGHTING ELEMENT AND ASSOCIATED SYSTEM

(71) Applicant: MEDIATEK INC., Hsin-Chu (TW)

(72) Inventors: Chenghao Liu, San Jose, CA (US); Shan Liu, San Jose, CA (US)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/836,969

(22) Filed: Aug. 27, 2015

(65) Prior Publication Data
US 2016/0174342 A1    Jun. 16, 2016

Related U.S. Application Data

(60) Provisional application No. 62/089,983, filed on Dec. 10, 2014.

(51) Int. Cl.
*H05B 33/08*    (2006.01)
*H05B 37/02*    (2006.01)

(52) U.S. Cl.
CPC ..... *H05B 37/0272* (2013.01); *H05B 33/0845* (2013.01); *H05B 33/0857* (2013.01); *Y02B 20/46* (2013.01)

(58) Field of Classification Search
CPC ............ H05B 33/0845; H05B 37/0245; H05B 37/0272; H05B 41/38
See application file for complete search history.

(56) References Cited

U.S. PATENT DOCUMENTS

| | | | | |
|---|---|---|---|---|
| 6,936,978 B2 * | 8/2005 | Morgan | ................... | F21K 9/23 315/291 |
| 7,573,208 B2 * | 8/2009 | Newman, Jr. | ........ | H05B 39/088 315/149 |
| 8,742,686 B2 * | 6/2014 | Zampini, II | ....... | H05B 33/0857 257/13 |
| 9,474,116 B2 * | 10/2016 | Ng | ..................... | H05B 33/0827 |
| 2010/0110111 A1 * | 5/2010 | Kim | ..................... | G09G 3/3426 345/690 |
| 2013/0016118 A1 * | 1/2013 | Mizushiro | ............ | H04N 9/3147 345/589 |
| 2013/0231796 A1 * | 9/2013 | Lu | ........................ | H04L 12/2807 700/295 |
| 2014/0252987 A1 * | 9/2014 | Hinrichs | ............ | H05B 33/0845 315/297 |
| 2014/0300285 A1 * | 10/2014 | Medak | ............... | H05B 33/0845 315/186 |
| 2014/0375216 A1 * | 12/2014 | Seidmann | .......... | H05B 33/0845 315/149 |
| 2015/0077017 A1 * | 3/2015 | So | .......................... | F21S 6/002 315/297 |

(Continued)

OTHER PUBLICATIONS

City Theatrical,The MasterBlast Users Manual, Dated 2008, Rev 1.8, pp. 6-12.*

*Primary Examiner* — Alexander H Taningco
*Assistant Examiner* — Kurtis R Bahr
(74) *Attorney, Agent, or Firm* — Winston Hsu; Scott Margo (57) ABSTRACT

A method for controlling at least one lighting element includes: setting a dimming speed; determining a dimming level according to the dimming speed; and using the dimming level to perform a stepped dimming operation to brighten or dim the lighting element.

6 Claims, 5 Drawing Sheets

(56) References Cited

U.S. PATENT DOCUMENTS

2015/0305116 A1* 10/2015 Vora ..................... H05B 37/029
                                                    315/292
2015/0351191 A1* 12/2015 Pope .................. H05B 33/0863
                                                    315/294
2015/0364107 A1* 12/2015 Sakariya ............... G06F 3/0412
                                                    345/174

* cited by examiner

METHOD FOR CONTROLLING LIGHTING ELEMENT AND ASSOCIATED SYSTEM

CROSS REFERENCE TO RELATED APPLICATIONS

This application claims the priority of U.S. Provisional Application No. 62/089,983, filed on Dec. 10, 2014, which is included herein by reference in its entirety.

BACKGROUND

In some of the Internet of Things (IoT) standards, dimmer/dimming is one of resources which need to be modeled to control the brightness of the lighting element. However, there are several limitations in these standards, such as no dimming speed is specified and too many restrictions to deploy the dimming model in various event related scenario.

SUMMARY

It is therefore an objective of the present invention to provide a method for controlling lighting element(s) and system, which may simply control the lighting device in various events, to solve the above-mentioned problems.

According to one embodiment of the present invention, a method for controlling at least one lighting element comprises: setting a dimming speed; determining a dimming level according to the dimming speed; and using the dimming level to perform a stepped dimming operation to brighten or dim the lighting element.

According to another embodiment of the present invention, a method for controlling at least one lighting element comprises: setting a specific period; and performing a stepped dimming operation to brighten or dim the lighting element from a current brightness to a target brightness during the specific period.

According to another embodiment of the present invention, a system comprises an electronic device and at least one lighting device comprising at least one lighting element and a controller; wherein the electronic device wirelessly transmits a signal to the lighting device; and the controller of the lighting device sets a dimming speed according to the received signal from the electronic device, and determines a dimming level according to the dimming speed, and uses the dimming level to perform a stepped dimming operation to brighten or dim the lighting element.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
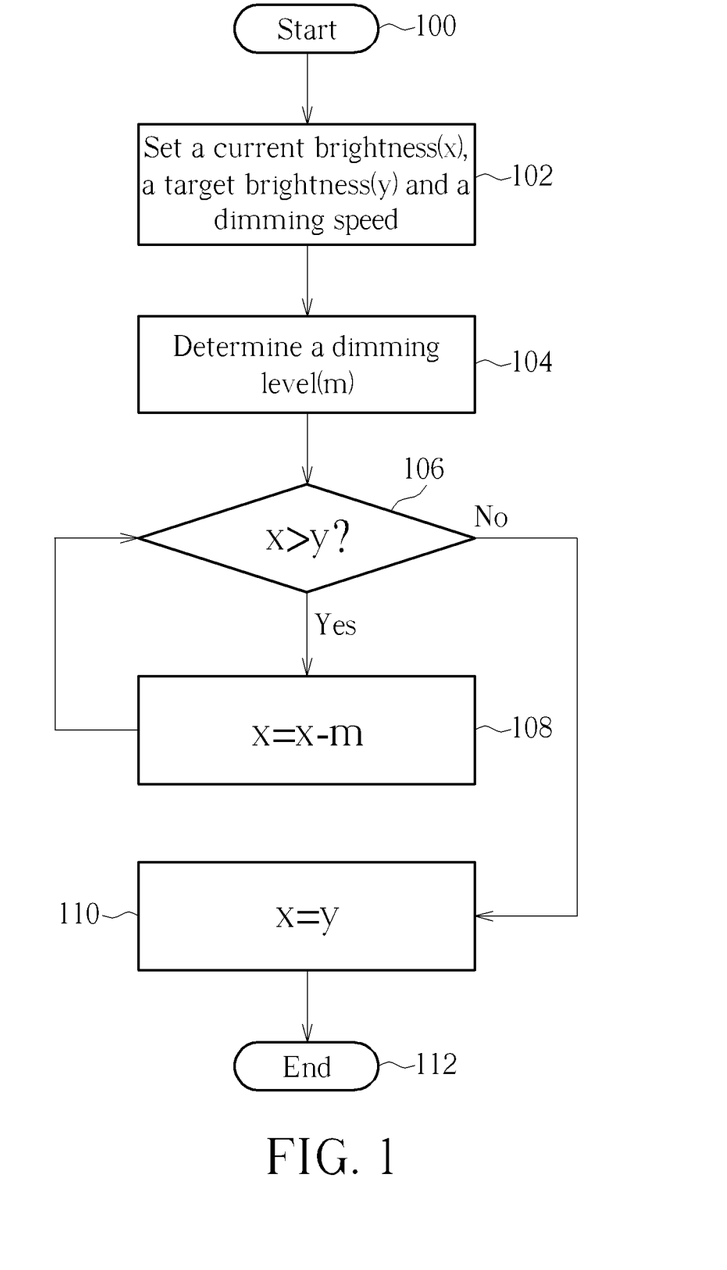
FIG. 1 is a flowchart of a method for dimming a lighting device according to one embodiment of the present invention.

Please refer to FIG. 1, which is a flowchart of a method for dimming a lighting device according to one embodiment of the present invention, where the lighting device may comprise a lighting element such as a light-emitting diode (LED), a fluorescent lamp or any other element whose brightness can be stepped up and stepped down. Refer to FIG. 1, the flow is described as follows.

In Step 100, the flow starts. In Step 102, the lighting device sets a current brightness, a target brightness and a dimming speed, where the determination of the dimming speed will be described later. In Step 104, the lighting device calculates a dimming level according to the dimming speed. In one embodiment, the dimming level may be calculated by using the following formula (1) or (2)

$$m = \text{INT}(|(x-y)/(D\_speed \cdot k)|) \quad (1)$$

$$m = \text{INT}(|(L\max - L\min)/(D\_speed \cdot k)|) \quad (2)$$

wherein "m" is the dimming level, "INT( )" is an integer operator, "x" is the current brightness of the lighting element, "y" is the target brightness of the lighting element, "D_speed" is the dimming speed, "k" is a speed factor, "Lmax" is a maximum dimming level of the lighting element, "Lmin" is a minimum dimming level of the lighting element. It is noted that "INT ( )" may have several types, for example, INT( ) may be a floor function, INT(a)=[a], which rounds up to the nearest integer not greater than "a"; or INT( ) may be a ceiling function, INT(a)=[a]+1, which rounds down to the nearest integer not less than "a"; or INT( ) is a nearest integer, which is INT(a)=[a+0.5].

Then, in Step 106, the lighting device determines whether the current brightness is greater than the target brightness or not, and if the current brightness is greater than the target brightness, the flow enters Step 108 to decrease the brightness by a decrement of the dimming level and the flow goes back to Step 106 until current brightness is not greater than the target brightness. In Step 106 if the current brightness is not greater than the target brightness, the flow enters Step 110 to set the current brightness equal to the target brightness and the flow enters Step 112 to finish the process.

Figure 2:
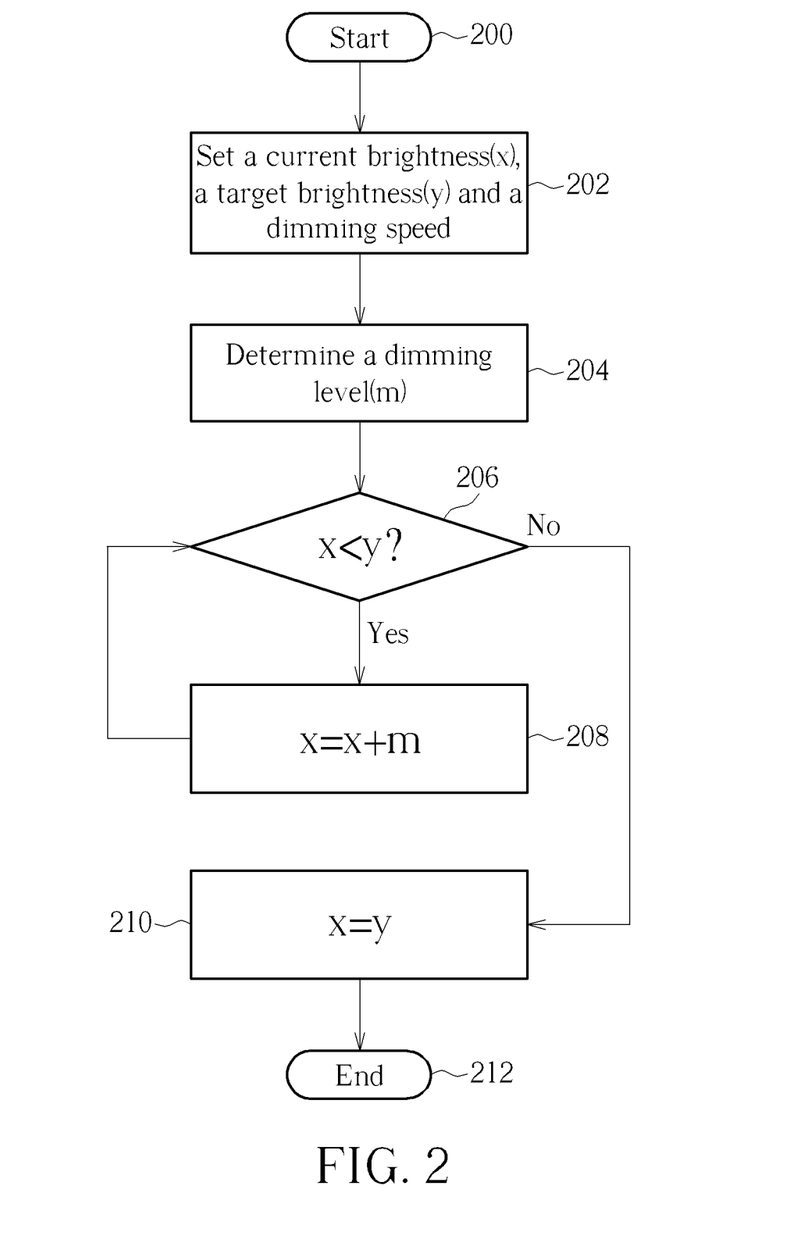
FIG. 2 is a flowchart of a method for brightening a lighting device according to one embodiment of the present invention.

Please refer to FIG. 2, which is a flowchart of a method for brightening a lighting device according to one embodiment of the present invention, where the lighting device may comprise a lighting element such as a light-emitting diode (LED), a fluorescent lamp or any other element whose brightness can be stepped up and stepped down. Refer to FIG. 2, the flow is as follows.

In Step 200, the flow starts. In Step 202, the lighting device sets a current brightness, a target brightness and a dimming speed, where the determination of the dimming speed will be described later. In Step 204, the lighting device calculates a dimming level according to the dimming speed. In one embodiment, the dimming level may be calculated by using the aforementioned formula (1) or (2). Then, in Step 206, the lighting device determines whether the current brightness is less than the target brightness or not, and if the current brightness is less than the target brightness, the flow enters Step 208 to increases the brightness by an increment of the dimming level and the flow goes back to Step 206 until current brightness is not less than the target brightness. In Step 206 if the current brightness is not less than the target brightness, the flow enters Step 210 to set the current brightness equal to the target brightness and the flow enters Step 212 to finish the process.

Figure 3:
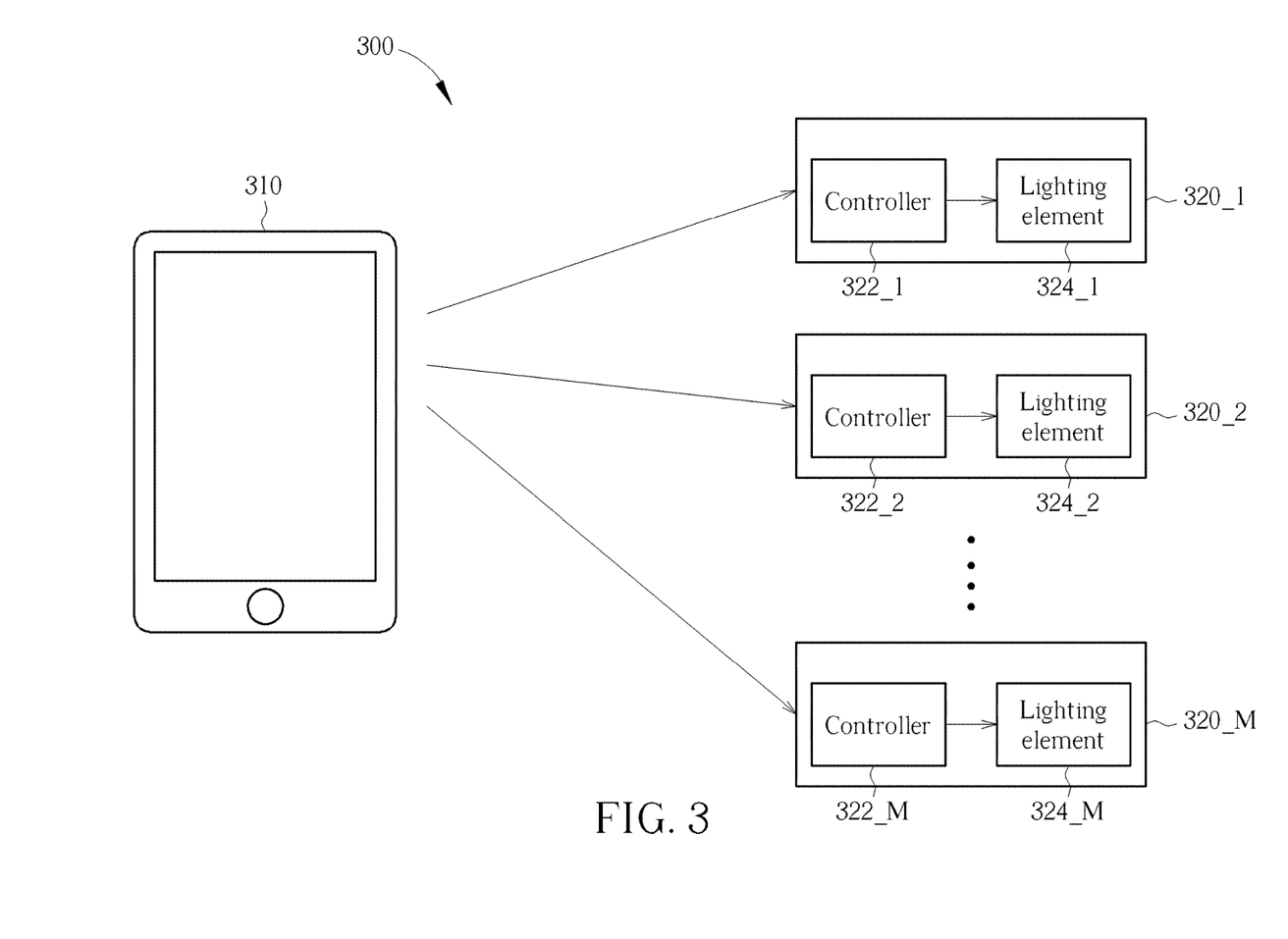
FIG. 3 is a diagram illustrating a system according to one embodiment of the present invention.

Please refer to FIG. 3, which is a diagram illustrating a system 300 according to one embodiment of the present invention. As shown in FIG. 3, the system 300 comprises an electronic device 310 and a plurality of lighting device 320_1-320_M, where the electronic device 310 may be a smartphone or a tablet, and the lighting device 320_1-320_M comprises controllers 322_1-322_M and lighting elements 324_1-324_M, respectively. In this embodiment, taking the lighting device 320_1 as an example, when a user wants to adjust the brightness of the lighting device 320_1, the user may control the electronic device 310 to wirelessly transmit a triggering signal, a target brightness and a dimming speed to the lighting device 320_1. After receiving the triggering signal, the controller 322_1 of the lighting device 320_1 is triggered to perform the flow shown in FIG. 1 to dim the lighting element 324_1 or to perform the flow shown in FIG. 2 to brighten the lighting element 324_1. Then, the controller 322_1 directly uses the received dimming speed from the electronic device 310 to set the dimming speed (Step 102 or Step 202). For example, assuming that the dimming speed the user can select is from "1" to "100" ("1" is the highest speed, and "100" is the lowest speed) and the user selects a value "90" to dim the lighting element 324_1 at a lower speed, the electronic device 310 directly transmits the value "90" to the lighting device 320_1, and the controller 322_1 directly uses the received dimming speed "90" from the electronic device 310 to set the dimming speed. Then, the controller 322_1 determines a dimming level according to the dimming speed (Step 104 or Step 204), and uses the dimming level to perform a stepped dimming operation to brighten or dim the lighting element 324_1 (Steps 106-110 or Step 206-210).

In the above-mentioned embodiment, the dimming speed is represented by an unsigned integer without unit, and the dimming level is calculated using the received dimming speed by the lighting device 320_1, therefore, the lighting device 320_1 can avoid receiving and generating an invalid command (i.e. invalid dimming speed or invalid dimming level) that exceeds physical dimming restrictions.

In the embodiment shown in FIG. 3, if the lighting device 320_1-320_M are required to be adjusted, the electronic device 310 may separately transmit the corresponding dimming speeds to the lighting device 320_1-320_M, respectively; or the electronic device 310 may transmit a single packet comprising all the dimming speeds for the lighting device 320_1-320_M, and each of the lighting device 320_1-320_M can extract the corresponding dimming speed from the packet.

In this embodiment, because the electronic device 310 only needs to send the relative dimming speed(s) to the lighting devices 310_1-310_M to control the dimming process, the user can simply control the lighting devices 310_1-
310_M when the lighting devices 320_1-320_M have different dimming ranges, without tuning command parameters for each of the lighting devices 320_1-320_M.

In addition, in one embodiment, the system 300 is applied to a smart home, the lighting devices 320_1-320_M are placed in different positions, and the electronic device 310 may transmit a plurality of dimming speeds to the lighting devices 320_1-320_M, respectively, where the dimming speeds are not all the same. Therefore, the lighting devices 320_1-320_M may brighten or dim the lighting elements 324_1-324_M at different speeds, respectively.

Figure 4:
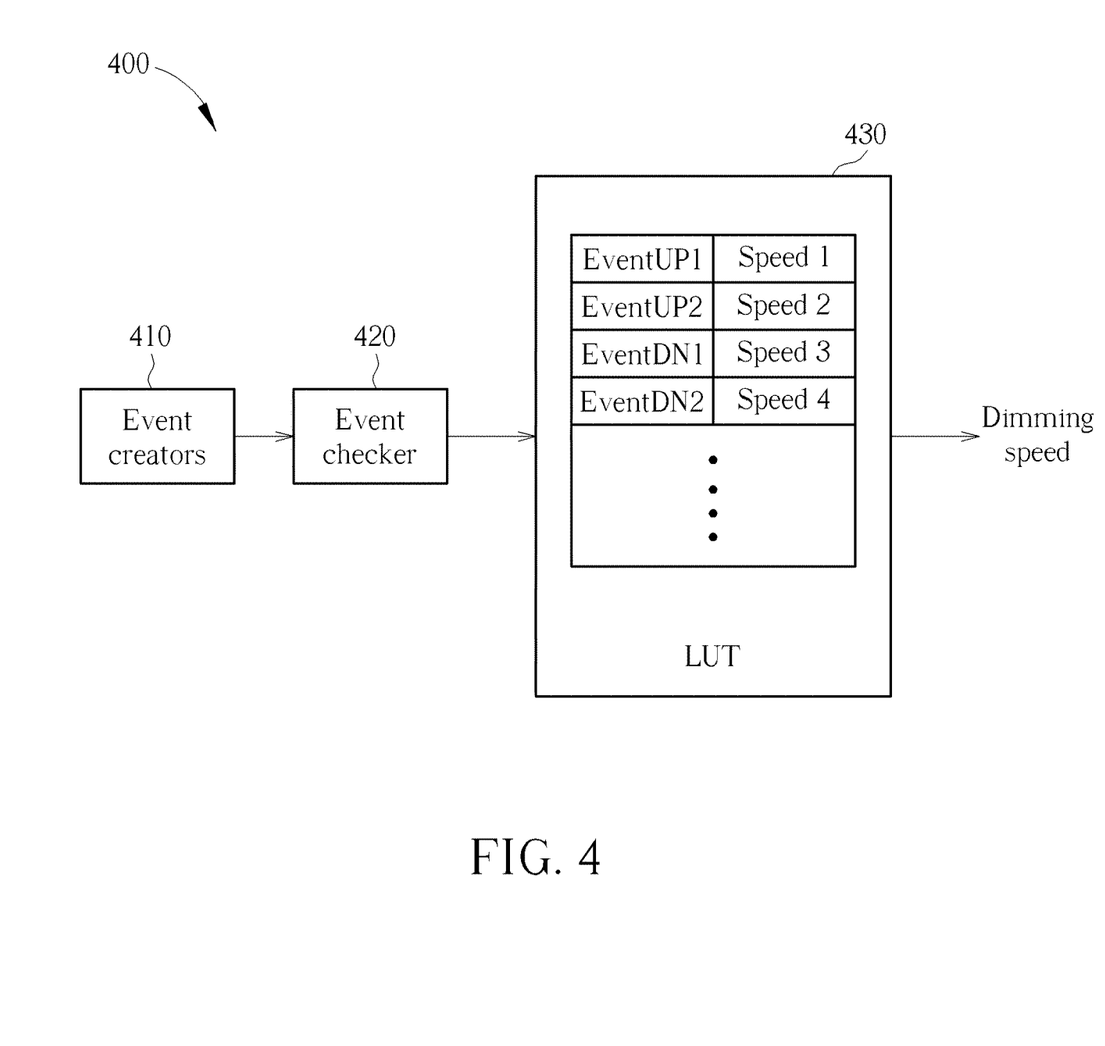
FIG. 4 shows a device for determining the dimming speed according to one embodiment of the present invention.

FIG. 4 shows a device 400 for determining the dimming speed according to one embodiment of the present invention. In this embodiment, the device 400 is positioned in the electronic device 310 shown in FIG. 3, and the device 400 comprises an event creator(s) 410, an event checker 420 and a look-up table, where the event creator(s) 410 may be an application (APP) or other user interface that allows the user to select one of the events such as a cinema application or a bedroom application, the event checker 420 is used to choose a dimming speed corresponding the event selected by the user from a look-up table (LUT) 430, and the LUT 430 comprises a plurality of events EventUP1, EventUP2, EventDN1, EventDN2 and corresponding dimming speeds Speed1-Speed4, respectively.

In the embodiment shown in FIG. 4, if the user wants to control the lighting devices 320_1-320_M shown in FIG. 3 by using the cinema application defined in the electronic device 310, the user can select the cinema event via the event creator(s) 410, and the event checker 420 may refer the user's input to choose a dimming speed in the LUT 430. Assuming that the cinema event corresponds to the "EventUP2" of the LUT 430, the LUT 430 may output "Speed2" recorded in the LUT 430 as the dimming speed, and the electronic device 310 may transmits the dimming speed "Speed2" to the lighting devices 320_1-320_M.

By using the embodiment shown in FIG. 4, the user can simply control the lighting devices 320_1-320_M to have the dimming speeds the user wants. In addition, the contents of the LUT 430 may be modified or updated by the user.

In the embodiment shown in FIG. 3 and FIG. 4, the device 400 is positioned in the electronic device 310, and the electronic device 310 directly transmits the dimming speed to the lighting device 320_1320_M. In other embodiments, however, the event checker 420 and the LUT 430 shown in FIG. 4 may be positioned in each of the lighting device 320_1320_M, and the electronic device 310 merely transmits an event to the lighting device 320_1320_M. In detail, in this alternative embodiment, the user can select an event via the event creator(s) 410, and the electronic device 310 wirelessly transmits a signal including the selected event to the lighting device 320_1320_M. Then, for each of the lighting device 320_1-320_M, the event checker 420 refers the received signal (i.e. selected event) to choose a dimming speed in the LUT 430, then the controller 322_1-322_M may use the dimming speed outputted by the LUT 430 to calculate the dimming level to perform a stepped dimming operation to brighten or dim the lighting elements 324_1-324_M. This alternative design shall fall within the scope of the present invention.

Figure 5:
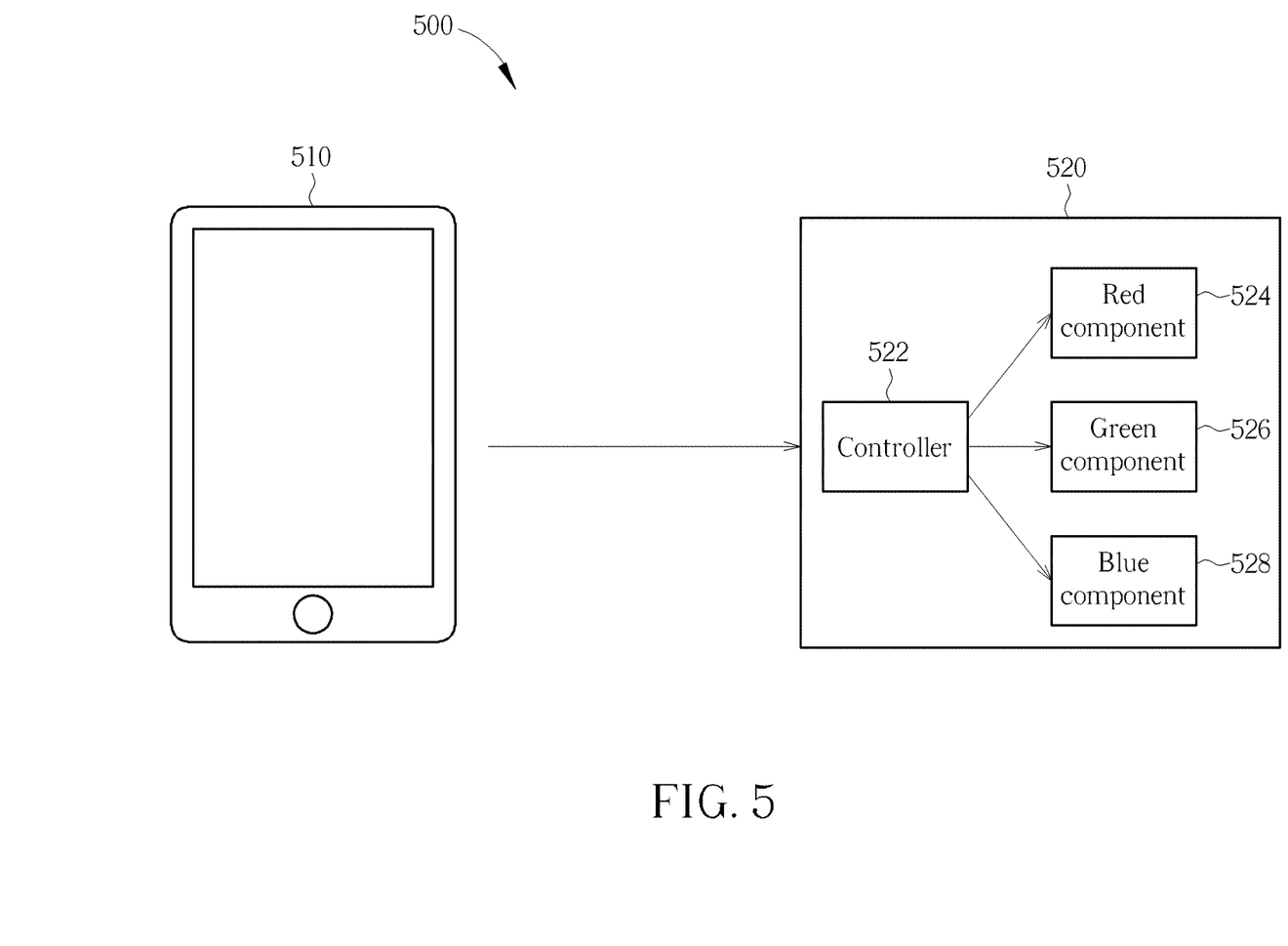
FIG. 5 is a diagram illustrating a system according to another embodiment of the present invention.

Please refer to FIG. 5, which is a diagram illustrating a system 500 according to another embodiment of the present invention. As shown in FIG. 5, the system 500 comprises an electronic device 510 and a lighting device 520, where the electronic device 510 may be a smartphone or a tablet, and the lighting device 520 comprises a controller 522 and a plurality of color components, and in this embodiment the color components may be implemented by LEDs and comprise a red component 524, a green component 526 and a blue component 528. When a user wants to adjust the brightness of the lighting device 520 or adjust the color of the lighting device 520, the user may control the electronic device 510 to wirelessly transmit a triggering signal, at least one target brightness and at least one dimming speed to the lighting device 520. After receiving the triggering signal, the controller 522 of the lighting device 520 is triggered to perform the flow shown in FIG. 1 to dim at least one of the color components or to perform the flow shown in FIG. 2 to brighten at least one of the color components. For at least one of the color components, the controller 522 directly uses the received dimming speed from the electronic device 510 to set the dimming speed (Step 102 or Step 202). For example, assuming that the dimming speed for the red component 524 the user can select is from "1" to "100" ("1" is the highest speed, and "100" is the lowest speed) and the user selects a value "15" to dim the red component 524 at a higher speed, the electronic device 510 directly transmits the value "15" to the lighting device 520, and the controller 522 directly uses the received dimming speed "90" from the electronic device 510 to set the dimming speed of the red component 524. Then, the controller 522 determines a dimming level according to the dimming speed (Step 104 or Step 204), and uses the dimming level to perform a stepped dimming operation to brighten or dim the red component 524 (Steps 106-110 or Step 206-210).

It is noted that not all the color components are required to be adjusted in response to the trigger signal, that is the controller 522 may separately and independently control the red component 524, the green component 526 and the blue component 528. For example, the user may use the electronic 510 to control the lighting device 520 to dim the red component 524 at a first dimming speed, to brighten the green component 526 at a second dimming speed, and to not adjust the brightness of the blue component 528 (i.e. the dimming speed is equal to zero).

In addition, the device 400 shown in FIG. 4 and its alternative design can be applied to the system 500 shown in FIG. 5, that is the user may select an event via the event creator(s) 410, and the event checker 420 may refer the user's input to choose at least one dimming speed in the LUT 430 for at least one of the red component 524, the green component 526 and the blue component 528, then the controller 522 may use the dimming speed outputted by the LUT 430 to calculate the dimming level to perform a stepped dimming operation to brighten or dim the at least one of the red component 524, the green component 526 and the blue component 528.

In the above embodiments of FIG. 1-FIG. 5, the electronic device 310/510 or the lighting device 320/520 is arranged to determine the dimming level according to the dimming speed, then the lighting device 320/520 is dimmed or brightened by using the dimming level.

In another embodiment, however, the electronic device may be set by a specific period, and the lighting device is performed a stepped dimming operation to brighten or dim the lighting element from a current brightness to a target brightness during the specific period. In detail, to make the lighting element to be dimmed or brightened uniformly from the current brightness to the target brightness, the electronic device or the lighting device doesn't need to calculate a dimming level, but uses the current brightness, the target brightness and the specific period for the stepped dimming operation.

However, in this embodiment, calculating the diming level may also be included. For example, if the specific period is short, the determined dimming level may be large and/or the time interval may be short to make the lighting element to be dimmed or brightened fast; and if the specific period is long, the determined dimming level may be small and/or the time interval may be great to make the lighting element to be dimmed or brightened slowly. In addition, all the embodiments and alternative designs described in FIG. 1-FIG. 5, if not conflict, can be applied to this embodiment using the specific period.

Briefly summarized, in the embodiments of the present invention, the dimming level of the stepped dimming operation is calculated based on the unsigned dimming speed or the specific period, therefore the lighting device can avoid generating an invalid command that exceeds physical dimming restrictions. In addition, the present invention can be easily implemented in various event related scenario.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for controlling at least one lighting element within a lighting device, comprising:
  receiving a dimming speed from an electronic device outside the lighting device, wherein the dimming speed is represented by an unsigned integer without unit;
  calculating a dimming level according to the dimming speed, wherein the dimming level is calculated by using a formula:

$$m=\text{INT}(|(x-y)/(D\_speed*k)|),$$

"m" is the dimming level, "x" is a current brightness of the lighting element, "y" is the target brightness of the lighting element, "D_speed" is the dimming speed, and "k" is a speed factor; and
  using the dimming level to perform a stepped dimming operation to brighten or dim the lighting element.

2. The method of claim 1, wherein the method is for controlling a plurality of lighting elements, and the lighting elements comprise a plurality of color components with different colors, and the steps of receiving the dimming speed, calculating the dimming level, and brightening or dimming the lighting element comprise:
  receiving a plurality of dimming speeds for the color components, respectively;
  calculating a plurality of dimming levels for the color components according to the dimming speeds, respectively; and
  brightening or dimming the color components by using the dimming levels.

3. The method of claim 2, wherein the dimming speeds are not all the same.

4. The method of claim 1, wherein the method is arranged for controlling a plurality of lighting elements positioned in different places, and the steps of receiving the dimming speed, calculating the dimming level, and brightening or dimming the lighting element comprise:
  receiving a plurality of dimming speeds for the lighting devices, respectively;
  calculating a plurality of dimming levels for the lighting devices according to the dimming speeds, respectively; and brightening or dimming the lighting devices by using the dimming levels, respectively.

5. The method of claim 4, wherein the dimming speeds are not all the same.

6. A method for controlling at least one lighting element within a lighting device, comprising:
receiving a dimming speed from an electronic device outside the lighting device, wherein the dimming speed is represented by an unsigned integer without unit;
calculating a dimming level according to the dimming speed, wherein the dimming level is calculated by using a formula:

$$m = \text{INT}(|(L\max - L\min)/(D\_speed * k)|),$$

"m" is the dimming level, "Lmax" is a maximum dimming level, "Lmin" is a minimum dimming level, "D_speed" is the dimming speed, and "k" is a speed factor; and
using the dimming level to perform a stepped dimming operation to brighten or dim the lighting element.

\* \* \* \* \*